United States Patent [19]

Miyanaga

[11] Patent Number: 4,998,981
[45] Date of Patent: Mar. 12, 1991

[54] BIT FOR DRILLING AN UNDERCUT HOLE

[75] Inventor: Masaaki Miyanaga, Ashiya, Japan

[73] Assignee: Kabushiki Kaisha Miyanaga, Miki, Japan

[21] Appl. No.: 513,563

[22] Filed: Apr. 24, 1990

[30] Foreign Application Priority Data

Apr. 24, 1989 [JP]   Japan ................... 1-104188

[51] Int. Cl.⁵ .................... E21B 7/28; E21B 10/32
[52] U.S. Cl. ............................ 175/286; 175/202; 175/289
[58] Field of Search ............ 175/202, 220, 284, 286, 175/289, 291; 408/158; 82/1.2, 1.4

[56] References Cited

U.S. PATENT DOCUMENTS

| 2,401,515 | 6/1946 | Schutte et al. | 175/286 |
| 2,626,023 | 1/1953 | Lear | 175/202 |
| 3,454,118 | 7/1969 | White | 175/289 |
| 4,091,882 | 5/1978 | Hashimoto | 175/286 |
| 4,347,768 | 9/1982 | Boehm | 85/1.5 |
| 4,444,279 | 4/1984 | Kessler et al. | 175/286 |
| 4,497,383 | 2/1985 | Ostertag | 175/202 |
| 4,635,737 | 1/1987 | Miyanaga | 175/284 |
| 4,700,789 | 10/1987 | Velasco | 175/202 |
| 4,930,585 | 6/1990 | Noser et al. | 175/202 |

FOREIGN PATENT DOCUMENTS

| 8622 | 6/1980 | EPO |
| 2331467 | 4/1981 | Fed Rep of Germany |
| 1434173 | 5/1976 | United Kingdom |

Primary Examiner—Bruce M. Kisliuk
Attorney, Agent, or Firm—Marshall, O'Toole, Gerstein, Murray & Bicknell

[57] ABSTRACT

A drill bit has an extendable and retractable undercut portion for the drilling of undercut holes, for example to accommodate anchor bolts in concrete.

The device includes a drill bit (18) for drilling an initial hold (B) to a predetermined depth at which stage a flange (12) on a guide sleeve (10) contacts the surface (A) of the workpiece. Further downward movement of the drill bit which is securely attached to a lower shank (4) of a body (1), causes relative upward movement of the guide sleeve (10) around the body (1). This in turn causes drive balls (17) accommodated within the flared upper and (11) of sleeve (10) to move inwardly and force apart tapered surfaces (3) and (6) on the body (1) and a slide sleeve (5) disposed between the shank (4) and sleeve (10). The slide sleeve (5) which carries dependent fingers (22) within flutes (20) along the length of the bit (18), thus moves down relative to the bit, forcing the lower ends of the fingers (22) over tapered lower ends (21) of the flutes, exposing cutting edges (24) on the ends of the fingers to grind an annular undercut groove (C) in the hole (B).

3 Claims, 2 Drawing Sheets

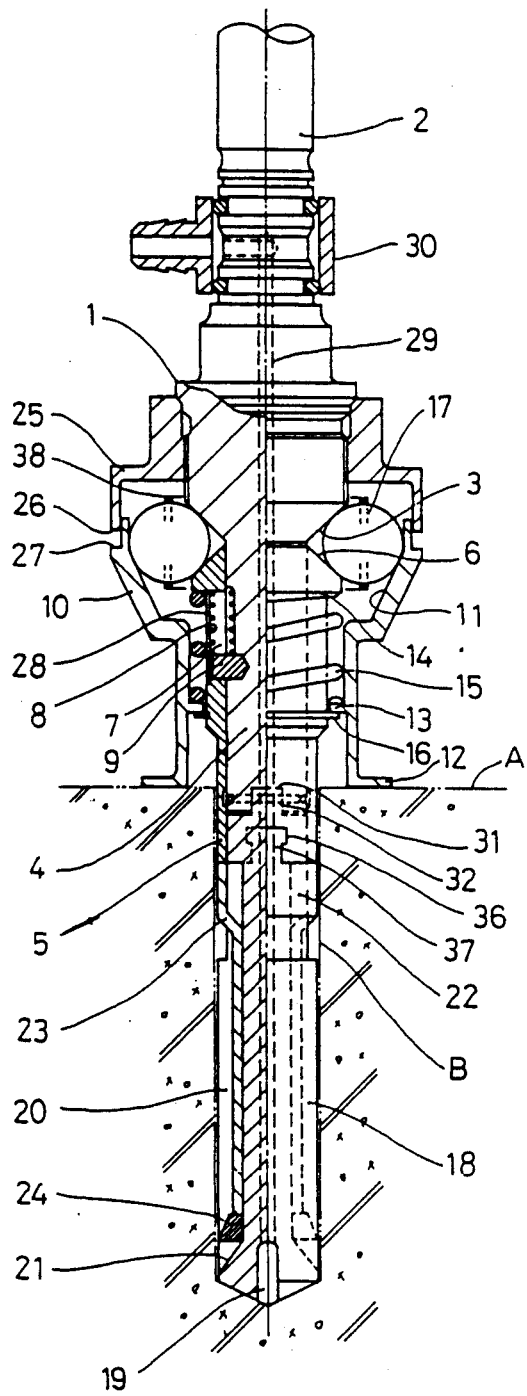
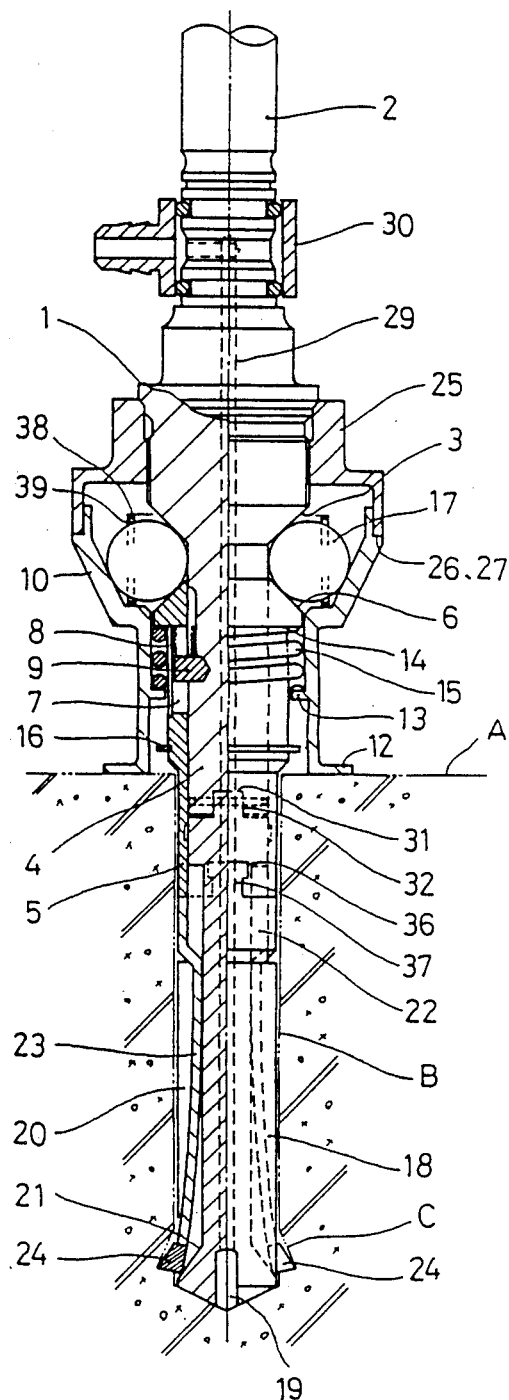
Fig. 1
Fig. 2

BIT FOR DRILLING AN UNDERCUT HOLE

This invention relates to a drill bit which may be used to drill an undercut hole for an anchor bolt.

It is common practice that when a structure is to be fixed onto the surface of hardened concrete, anchor bolts are buried into holes drilled in the concrete. In order to enhance the strength of the grip of the anchor bolt in the concrete, it has previously been proposed by the present applicant to form an undercut portion deep inside the hole. The anchor bolt to be buried in such a hole is composed of the bolt body provided with a protruding jaw at its base and a cylindrical expansion sleeve provided with axial slits. After the bolt has been positioned within the hole, the expansion sleeve is expanded in the gap between the protruding jaw of the bolt body and the undercut portion in such a way that the bolt attains a high frictional grip within the hole.

Moreover, the present applicant has previously proposed a reamer which undercuts the wall of a hole drilled to a prescribed depth, in order to create an undercut portion for the burial of an anchor bolt. For example, such a reamer may include a wedge inserted coaxially into a main portion and so arranged that the wedge can rotate with the body and move axially relative to it under spring bias and that a reaming edge at the lower end of the body moves along a protruding jaw at the lower end of the wedge so as to expand radially beyond the jaw. Thus, the wedge is inserted into the previously drilled hole and contacts the bottom of the hole and the main body is pushed into the hole against the spring bias to expand the reaming edge along the protruding jaw of the wedge to grind the undercut.

Such an undercut drill bit and an anchor bolt of the type described above, are illustrated in U.S. Pat. Nos. 4,635,737 and 4,865,246 respectively.

In order to drill an enlarged annular groove for the burial of conventional anchor bolts, an initial hole must be drilled using a conventional hammer drill, for example, and the enlarged annular groove or undercut must be drilled subsequently. However, it is troublesome to handle various tools and devices for this purpose, and a variety of operational problems are liable to arise.

The present invention seeks to provide a drill bit which permits the grinding of an enlarged annular undercut groove in the same operation as the drilling of the initial hole to a prescribed depth.

In accordance with the invention, there is now provided a drill bit for drilling an undercut hole, comprising:

a body portion having an upper shank, a lower shank and an intermediate downwardly tapered surface;

a slide sleeve located around the lower shank for rotation with and axial movement relative to the lower shank and having an upwardly tapering surface adjacent to and spring biased towards the tapered surface of the body portion;

a guide sleeve located around the slide sleeve for rotational and axial movement relative to the slide sleeve and having a flared upper end spring biased away from the tapered surfaces of the body portion and slide sleeve;

a plurality of drive bodies located within the flared upper end of the guide sleeve and against the tapered surfaces of the body portion and slide sleeve;

a drill bit attached axially to the lower shank and having longitudinal flutes in its peripheral surface, the flutes having tapered lower ends; and a plurality of fingers depending from the slide sleeve and accommodated within the flutes of the drill bit, each finger having a cutting edge at its lower end, the arrangement being such that upward axial movement of the guide sleeve forces the drive bodies between the tapered surfaces thereby forcing the slide sleeve and dependent fingers downwardly relative to the drill bit and causing the lower ends of the fingers to ride over the tapered ends of the flutes and force the cutting edges radially outwardly of the drill bit.

In a preferred aspect of the invention, the drive bodies are balls located within spaced apertures in a retaining ring within the flared upper end of the guide sleeve.

Suitably, the guide sleeve has a radially outwardly extending lower flange which contacts the surface of a work piece when the drill bit has drilled a hole of a predetermined depth.

Using the device of the invention, rotary drive is transmitted to the drill bit in order to drill an initial hole to a predetermined depth. At that stage, the lower flange on the guide sleeve comes into contact with the surface of the work piece and stops its descent. Further slight descent of the body portion due to continued drilling then drives the balls pushed by the tapered surface of the body portion, to descend the tapered surface of the guide sleeve radially inwardly against the spring bias. These balls press against the slide sleeve in reaction to the spring bias as if being wedged into and spreading the gap between both tapered surfaces. Since the motion of the slide sleeve is faster than the descent speed of the drill bit, the undercut bit formed by the fingers depending from the slide sleeve moves along the flutes and extends outside of the drill bit and grinds the hole wall to form an annular groove. At a predetermined point, descent of the main body stops to suspend the drilling of the hole as well as the grinding of the annular groove.

Subsequently, when the downward pressure is released, the guide sleeve and the slide sleeve return to their original positions under spring bias and the undercut edges retract into the flutes to permit the drill bit to be removed from the hole.

The present invention will now be described in greater detail by way of example only with reference to the accompany drawings, in which:

FIG. 1 is a partially sectional side view of a drill bit of the invention in its normal position;

FIG. 2 is a partly sectional side view of the drill bit of FIG. 1 in its reaming position;

Figure 3:
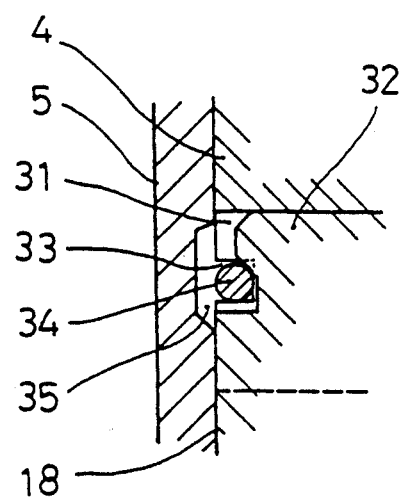
FIG. 3 is an enlarged partial sectional side view of the connecting portion of the drill bit of FIG. 1 at right angles to FIG. 1.

Referring to FIG. 1, a drill bit includes a main body 1 which has a shank 2 the upper end of which can be connected to a drive, an intermediate downwardly tapering frusto-conical surface 3, and a lower shank or portion 4. A cylindrical slide sleeve 5 surrounds the lower shank 4 and has an upwardly tapering frusto-conical surface 6 at its upper end. The sleeve 5 is provided with longitudinal slots 7 in its inner periphery and each slot 7 carries a compression spring 8. The lower end of the spring 8 bears against a pin 9 carried by the shank 4 so as to bias the slide sleeve 5 in the upward direction.

Under normal conditions, the tapered surface 3 of the main body 1 is close to the tapered surface 6 of the slide sleeve 5, forming an outward V-shaped groove between both parts. The slide sleeve 5 can move against the resistance of the springs 8, through the prescribed axial range relative to the lower shank 4 although its relative rotation is prevented by the pins 9.

Surrounding the slide sleeve 5 is a guide sleeve 10, the upper part of which flares outwardly, forming a frusto-conical surface 11 opposite the tapering surface 3, and the lower end of which has a radially outwardly extending flange 12. Intermediate its length the sleeve 10 has an inwardly projecting flange 13 which serves to support the sleeve 10 against a stopper ring 16 carried on the sleeve 5. The sleeve 10 is biased downwardly against the stopper ring 16 by a compression spring 15 which encircles the sleeve 5 and bears against the flange 13 and a shoulder 14 beneath the tapering surface 6.

A plurality of drive transmission balls 17 is held between the slide sleeve 5 and the guide sleeve 10 and is subjected to a compressive force by all the tapered surfaces 3, 6 and 11 of the main body 1, the slide sleeve 5 and the guide sleeve 10, respectively.

At the lower end of the shank 4 there is attached a drill bit 18. The lower end is V-shaped and constitutes a cutting edge 19 including a chip of an ultra-hard material. Guide flutes 20 are formed along the right and left sides of the length of the drill bit 18, the lower ends of the guide flutes forming slanting flute grooves 21.

An undercut bit 22 is connected to the lower end of the slide sleeve 5. It is in the form of a plate formed by machining a cylinder into a pair of fingers 23 having an appropriate elasticity. The lower end of each finger 23 is fitted with a reaming edge 24 including a chip of an ultra-hard material. The fingers 23 are a loose fit and hidden inside the guide flutes 20 in such a way that the reaming edges 24 are normally at the upper ends of slanting grooves 21.

A stopper sleeve 25 is fitted to the main body 1 above the guide sleeve 10. The lower edge 26 of the stopper sleeve 25 and the upper edge of the guide sleeve 10 are free to rotate and move telescopically though a prescribed axial range relative to each other. At the outer circumference of the guide sleeve 10, a regulating shoulder 27 is formed which contacts the lower edge 26 of the stopper sleeve 25 so as to regulate the descent of the undercut bit 22 in relation to the drill bit 18.

A cover 28 restrains the spring 8 in the slide sleeve 5, and a cuttings discharge pathway 29 is provided through the center of the main body 1 and the drill bit 18. The lower end of the pathway 29 is open near the cutting edge 19 and the upper end opens into a rotor 30 which is fitted rotatably onto the shank 2. Cuttings (such as chips of concrete) are removed through this rotor to piping connected to an external suction source (not shown).

The drill bit 18 can be detached from the lower shank 4 even after complete assembly of the device. A diametrical rectangular projection 31 on the top surface of the drill bit 18 is engaged in a mating rectangular groove 31 in the lower surface of lower shank 4. As best shown in FIG. 3, this engagement is maintained by a split ring 34 engaged with circumferential grooves 33 in the shank 4 and projection 32. A groove 35 is provided adjacent the outer grooves 33, in the inner circumference of the slide sleeve 5 which allows for expansion of the ring 34, whereby the projection 32 can engage with or disengage from the ring 34 by slight enlargement of the ring 34.

The undercut bit 22 is connected to the slide sleeve 5 before the attachment of the drill bit 18; it is connected by inserting a pair of opposite hooked connecting pieces 37 on the upper end of the undercut bit 22 laterally into mating notches 36 in the lower end of the slide sleeve 5.

Figure 4:
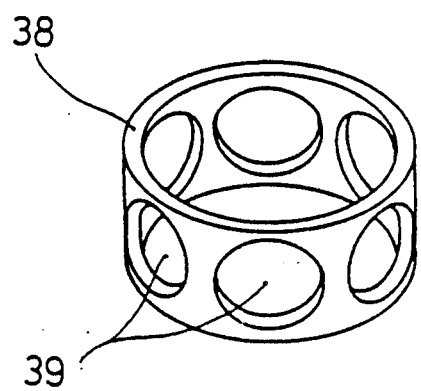
FIG. 4 is a perspective view of a retainer ring incorporated in the drill bit of FIG. 1.

A retainer ring 38 is used to retain in angular position the balls 17 within the guide sleeve 10. As shown in FIG. 4, retaining holes 39 are formed at spaced intervals around the ring in which the drive transmission balls are retained in such a way that the balls move together.

In use, the shank 2 is attached to the drive shaft of a drilling device in a conventional manner. When an initial hole B is drilled into the workpiece and the initial hole reaches the prescribed depth, the flange 12 comes into contact with the surface A of the workpiece as shown in FIG. 1, and the guide sleeve 10 is stopped.

If drilling is continued, as the body 1 descends, the balls 17 are pressed by its frusto-conical surface 3, descend the frusto-conical surface 11, become wedged between the frusto-conical surfaces 3 and 6 and widen the gap between the two, whereby the undercut bit 22 descends at a higher speed than the drill bit 18, and the reaming edges 24 move outwardly along the guide flutes 20 and expand beyond the drill bit 18 to grind a wider annular groove C. Subsequently, when the lower edge 26 of the stopper sleeve 25 comes into contact with the regulating stage 27 of the guide sleeve 10 as shown in FIG. 2, the descent of the main body 1 stops and the drilling of the initial hole B and grinding of the enlarged annular groove C also stop.

Thereafter, if the pressure on the main body 1 is reduced, the main body 1 floats in relation to the guide sleeve 10 under the action of the compression spring 15, and simultaneously the slide sleeve 5 and balls 17 return to their original positions under the action of springs 8, whereby the reaming edges 24 retract into the guide flutes 2 and are withdrawn, together with drill bit 18 from the drilled hole.

Use of the drilling device according the present invention avoids the need to drill in concrete, for example, a first hole and then separately to grind an enlarged annular groove for the burial of an anchor bolt. In accordance with the invention it is possible to grind an undercut following the drilling of an initial hole in a single operation. For this reason, when compared to conventional operations in which the initial hole and the undercut are drilled separately, operating according to the present invention is markedly improved.

I claim:

1. A drill bit for drilling an undercut hole, comprising:
- a body portion (1) having an upper shank (2), a lower shank (4) and an intermediate downwardly tapered surface (3);
- an slide sleeve (5) located around the lower shank (4) for rotation with and axial movement relative to the lower shank and having an upwardly tapering surface (6) adjacent to and spring biased towards the tapered surface (3) of the body portion (1);
- a guide sleeve (10) located around the slide sleeve (5) for rotational and axial movement relative to the slide sleeve and having a flared upper end (11) spring biased away from the tapered surfaces of the body portion and slide sleeve;

a plurality of drive bodies (17) located within the flared upper end (11) of the guide sleeve (10) and against the tapered surfaces of the body portion and slide sleeve;

a drill bit (18) attached axially to the lower shank (4) and having longitudinal flutes (20) in its peripheral surface, the flutes having tapered lower ends (21); and a plurality of fingers (22) depending from the slide sleeve (5) and accommodated within the flutes (20) of the drill bit (18), each finger having a cutting edge (24) at its lower end, the arrangement being such that upward axial movement of the guide sleeve (10) forces the drive bodies (17) between the tapered surfaces (3,6) thereby forcing the slide sleeve (5) and dependent fingers (22) downwardly relative to the drill bit (18) and causing the lower ends of the fingers (22) to ride over the tapered ends (21) of the flutes (20) and force the cutting edges (24) radially outwardly of the drill bit.

2. A drill bit according to claim 1, wherein the drive bodies are balls (17) located within spaced apertures (39) in a retaining ring (38) within the flared upper end of the guide sleeve.

3. A drill bit according to claim 1 or claim 2, wherein the guide sleeve has a radially outwardly extending lower flange (12) which contacts the surface (A) of a work piece when the drill bit (18) has drilled a hole (B) of a predetermined depth.

* * * * *